United States Patent
Kim et al.

(10) Patent No.: US 6,541,377 B2
(45) Date of Patent: Apr. 1, 2003

(54) METHOD AND APPARATUS FOR PREPARING POLYSILICON GRANULES

(75) Inventors: Young Hee Kim, Daejeon (KR); Yong-Ki Park, Daejeon (KR)

(73) Assignee: Korea Research Institute of Chemical Technology, Daejeon (KR)

(*) Notice: Subject to any disclaimer, the term of this patent is extended or adjusted under 35 U.S.C. 154(b) by 0 days.

(21) Appl. No.: 09/933,718

(22) Filed: Aug. 22, 2001

(65) Prior Publication Data

US 2002/0086530 A1 Jul. 4, 2002

(30) Foreign Application Priority Data

Jan. 3, 2001 (KR) .................................................. 01-237

(51) Int. Cl.[7] ........................ H01L 21/44; H01L 21/302
(52) U.S. Cl. ........................ 438/687; 438/484; 438/723
(58) Field of Search .................... 438/687, 484, 438/723

(56) References Cited

U.S. PATENT DOCUMENTS

| | | | |
|---|---|---|---|
| 4,150,168 A | | 4/1979 | Yatsurugi et al. |
| 4,786,477 A | | 11/1988 | Yoon et al. |
| 5,021,401 A | * | 6/1991 | Snyder et al. ............... 148/277 |
| 5,798,137 A | * | 8/1998 | Lord et al. ..................... 216/37 |
| 5,810,934 A | * | 9/1998 | Lord et al. ................... 118/725 |

OTHER PUBLICATIONS

Process Economics Program Report No. 160 "Silicones", SRI International, Jun. 1983, pp. 65–70.

* cited by examiner

*Primary Examiner*—Michael S. Lebentritt
(74) *Attorney, Agent, or Firm*—Lowe Hauptman Gilman & Berner, LLP

(57) ABSTRACT

The present invention relates to a method and an apparatus for preparing polysilicon, more specifically to a method and an apparatus for preparing polysilicon in granule form by equipping a fluidized bed reactor with a nozzle that provides an etching gas including hydrogen chloride in order to effectively prevent silicon from depositing on the outlet surfaces of the reaction gas supplying means and to be able to operate the reactor continuously in the bulk production of polysilicon granules.

13 Claims, 5 Drawing Sheets

METHOD AND APPARATUS FOR PREPARING POLYSILICON GRANULES

BACKGROUND OF THE INVENTION

FIELD OF THE INVENTION

The present invention relates to a method and an apparatus for preparing polysilicon (or polycrystalline silicon), more specifically to a method and an apparatus for preparing polysilicon in granule form by equipping a fluidized bed reactor with a nozzle that provides an etching gas including hydrogen chloride in order to effectively prevent silicon from depositing on the outlet surfaces of the reaction gas supplying means and to be able to operate the reactor continuously in the bulk production of polysilicon granules.

High-purity polysilicon is used as a raw material of semiconductor-grade single crystal or solar cell-grade silicon substrate for photovoltaic application. The polysilicon is prepared by the chemical vapor deposition method that deposits silicon continuously on silicon surfaces through thermal decomposition or hydrogen reduction of silicon-containing gas.

For the commercial bulk production of polysilicon, a bell-jar type reactor is generally used. The polysilicon prepared with this reactor has rodlike form with a diameter of about 50–300 mm. Since a bell-jar type reactor, which requires electrical resistance heating, is limited in its rod diameter, it cannot produce products continuously and a large amount of power is consumed to keep the temperature of the silicon rod surfaces above 1,000° C.

Recently, a silicon deposition process using a fluidized-bed type reactor, which produces polysilicon in granule form with a particle diameter of about 0.5–5 mm, has been proposed in order to solve said problems. According to this process, a fluidized bed of moving silicon particles is formed by the reaction gas supplied from the lower part of the reactor toward its upper part. Elementary silicon is continuously deposited on the hot surfaces of the fluidizing silicon particles, which grow into polysilicon product granules. Being enlarged from the smaller seed crystals due to the repeated silicon deposition, the larger particles tend to lose mobility and to settle downward. Here, the seed crystals can be supplied continuously or periodically into the fluidized bed, and the enlarged particles can be withdrawn continuously or periodically from the lower part of the reactor.

The polysilicon prepared using a bell-jar type reactor or a fluidized-bed reactor is substantially used for the preparation of silicon single crystal, which is a fundamental material of semiconductor wafer. The silicon single crystal is produced mostly with a Czochralski-type grower, where the high-purity polysilicon feedstock is heated to its melting point of about 1,400° C. in a crucible and then a single crystal is slowly grown up from the silicon melt. In the crystal growing process, while the polysilicon granules can be charged directly into the crucible of the crystal grower, the rodlike polysilicon produced in a conventional bell-jar type reactor should be subjected to crushing and sorting processes before being charged into the crucible. Also, complicated processes like etching with a high-purity inorganic acid, washing with ultra pure water, drying and packaging under clean atmosphere are additionally required to remove the impurities of the silicon surfaces that are contaminated during said crushing and sorting processes.

Because the polysilicon in a rod form produced with a bell-jar type reactor has such disadvantages as serious material loss during the additional treatment processes and increased costs related with the removal of impurities, the polysilicon granules produced by a fluidized bed reactor are expected to gradually replace the rodlike product in the future.

Another advantage of the fluidized bed reactor is that a much higher reaction yield can be obtained in case of the silicon deposition of silicon particles with very large surface area compared with that on silicon rods in the bell-jar type reactor under the same reaction condition.

Since the silicon-containing gas begins decomposition at the temperature higher than 300–400° C., an initial decomposition temperature, the reaction for silicon deposition can proceed on any solid surfaces within a fluidized bed reactor if the reaction temperature is higher than the initial decomposition temperature. Silicon can be deposited on the hot surfaces irrespective of their types and material composition. Therefore, silicon deposition and its accumulation may occur not only on the surface area of the fluidizing silicon particles but also on that of reaction gas supplying means whose temperature is maintained nearly as high as the reaction temperature.

The problem of accumulation of silicon deposit on the surfaces of the reaction gas supplying means is the severest at its outlet side, where the reaction gas is injected into the fluidized bed. If silicon is deposited on the outlet surfaces, which are in continuous contact with high-temperature silicon particles, the temperature of the outlet surfaces is maintained to be nearly the same as that of those particles. Silicon deposition by the injected reaction gas thus always proceeds also on the outlet surfaces of said reaction gas supplying means, by which the thickness of the accumulated silicon deposit at the outlet surfaces should continue to increase gradually.

This unwanted accumulation of silicon deposit interferes with the continuous operation of the fluidized bed reactor, which is a serious problem for bulk production of polysilicon granules. The degree of accumulation of the silicon deposit depends, somewhat differently, on the geometry of the outlet of the reaction gas supplying means, the shape of reaction gas injection and the pattern of contact between the fluidizing silicon particles and the accumulated silicon deposit. But its accumulated amount increases with operation time to change the geometry of the reaction gas outlet and ultimately to cause clogging.

In addition to these problems, the accumulation of silicon deposit may induce the physical or thermal deformation and stress due to the deposited layer or lump and cause a crack or damage of the reaction gas supplying means itself.

In order to solve these problems, a cooling medium such as cooling water, oil or gas may be circulated into the reaction gas supplying means to keep its surface temperature below a predetermined value. Otherwise, preheating of the reaction gas outside the reactor needs to be minimized to lower the temperature of the reaction gas supplying means. In this case, the cooling of the reaction gas supplying means itself should be thorough in order to decrease the surface temperature of the reaction gas supplying means exposed to the inside of the reactor at about 1,000° C., especially the surface temperature of the reaction gas outlet, below the initial decomposition temperature of the silicon-containing silane gas. However, because a high-purity inorganic material with low thermal conductivity should be used for the reaction gas supplying means to prevent the contamination of the reactor inside due to impurities, it is practically impossible to lower the temperature of the reaction gas supplying means sufficiently. Even being assumed to be possible, such sufficient cooling of the reaction gas supplying means will result in the quenching of the reaction gas.

As seen above, cooling of the reaction gas supplying means removes too much heat from the fluidized bed through radiation, convection and conduction. It is notable that the heating of fluidized bed within the reactor is the most important and difficult issue in the production of the granular polysilicon, especially when the production rate is high. Therefore, an intense removal of energy from the reactor inside due to thorough cooling of the reaction gas supplying means is undesirable. Moreover, the low-temperature reaction gas resulted from the cooling should lower the surface temperature of the silicon particles where the deposition reaction proceeds. This leads to reduction in production rate and reactor efficiency.

U.S. Pat. Nos. 4,150,168 and 4,786,477 disclose a method of providing silane gas with a temperature lower than the initial decomposition temperature into the reactor. In this method, a cooling medium such as cooling water is used to artificially cool the reaction gas supplying means in direct contact with the fluidized bed. Also being cooled thereby, the low-temperature reaction gas discharged from the reaction gas supplying means causes the fluidizing silicon particles to be quenched inevitably. Therefore, heating of the reactor inside becomes more difficult according to such proposed method. What is worse, the problem of accumulated silicon deposition on the surfaces of the reaction gas supplying means is not practically solved even with this method.

SUMMARY OF THE INVENTION

Accordingly, there is a serious problem of the silicon deposition on the surfaces of the reaction gas supplying means, especially at its outlet, being originated from the direct contact of the reaction gas supplying means with high-temperature silicon particles of the fluidized bed reactor. However, no appropriate solution has been provided yet because of the inherent configuration of the fluidized bed reactor.

As mentioned above, a method of producing polysilicon using a conventional bell-jar type reactor cannot produce the polysilicon continuously; power consumption is large; and post-treatment is required before use. A fluidized bed reactor can solve to some extent those problems of the bell-jar type reactor. However, continuous operation of the fluidized bed reactor is impossible unless the accumulation of silicon deposit on the surfaces of the reaction gas supplying means is prevented.

Therefore, an apparatus and a method to prevent the accumulation of silicon deposit on the surfaces of the reaction gas supplying means should be developed for continuously preparing polysilicon with a fluidized bed reactor.

Therefore, an object of the present invention is to provide an apparatus and a method for preparing polysilicon, which prevents the accumulation of silicon deposit on the surfaces of the reaction gas supplying means and enables continuous operation of the reactor. The present invention achieves the object by injecting an etching gas including hydrogen chloride on the surfaces of the reaction gas supplying means of the fluidized bed reactor.

DETAILED DESCRIPTION OF THE INVENTION

Figure 1:
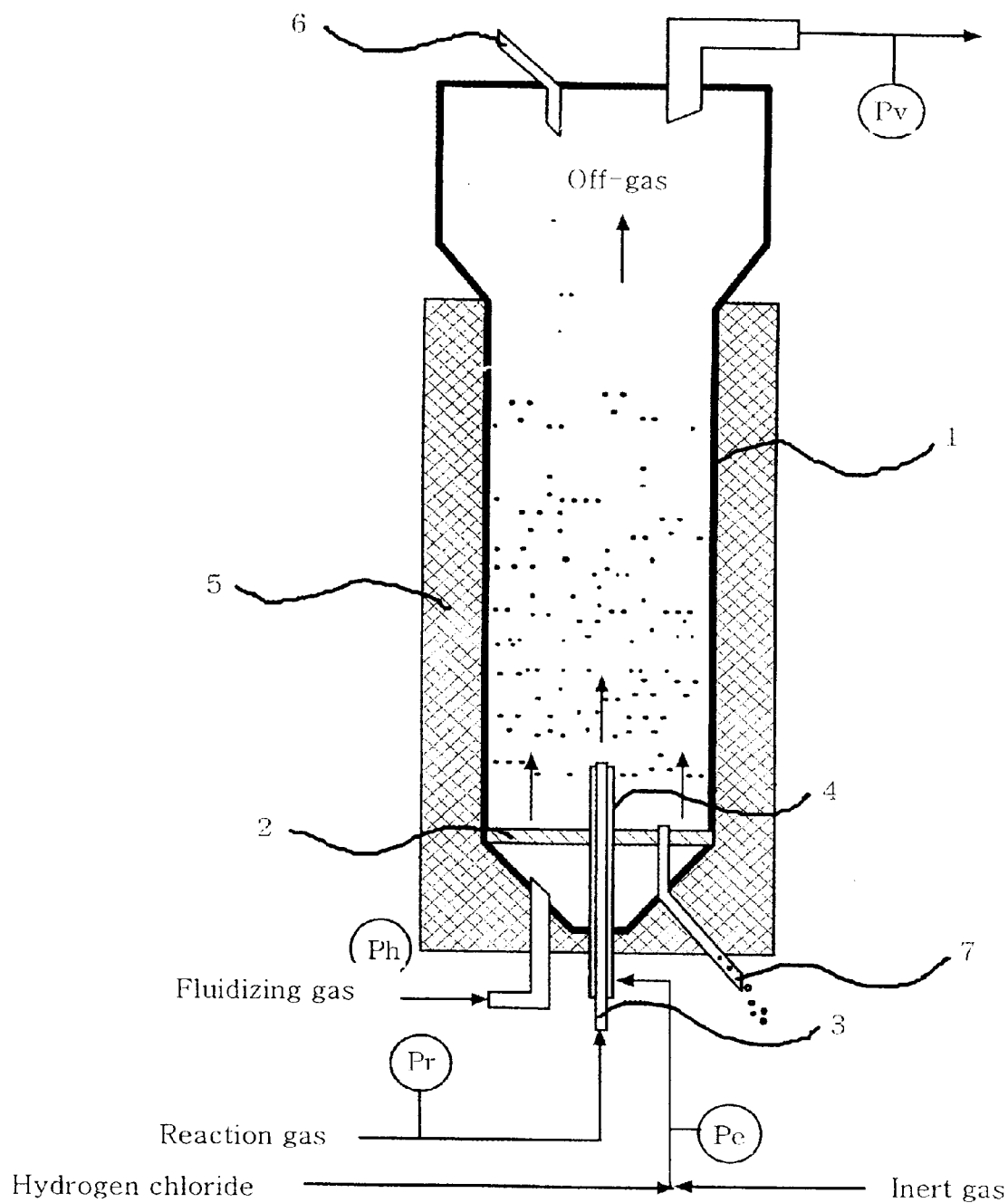
FIG. 1 is a schematic cross-sectional view of the fluidized bed reactor used for preparation of polysilicon according to the present invention.

The present invention is characterized by a method for preparing polysilicon continuously by supplying the reaction gas in the fluidized bed reactor, wherein an etching gas that includes hydrogen chloride is injected on the surfaces of the reaction gas supplying means located within the fluidized bed of silicon particles in order to prevent the accumulation of the silicon deposit on the surfaces of the reaction gas supplying means.

The present invention is also characterized by an apparatus for preparing polysilicon which includes a fluidized bed reactor comprising a fluidizing gas supplying means equipped with a gas distributor and a reaction gas supplying means equipped with a reaction gas nozzle, wherein said reaction gas nozzle is installed in a coaxial double-pipe form inside an etching gas nozzle for supplying said etching gas on the surfaces of said reaction gas nozzle.

Hereunder is given a more detailed description of the present invention.

The present invention relates to a method and an apparatus for preparing polysilicon by supplying reaction gas in a fluidized bed reactor where silicon particles are fluidizing, wherein an etching gas nozzle for supplying an etching gas that includes hydrogen chloride is equipped to effectively prevent silicon from being deposited and accumulated on the surfaces of the reaction gas supplying means, and thereby to enable a continuous operation of the reactor.

The etching gas used in the present invention includes hydrogen chloride, and may include an inert gas like hydrogen, nitrogen, argon or helium that does not react with hydrogen chloride.

The reaction gas used in the present invention includes one or more silane gases commonly used in the preparation of polysilicon, such as silicon tetrachloride ($SiCl_4$), trichlorosilane ($SiHCl_3$), dichlorosilane ($SiH_2Cl_2$) or monosilane ($SiH_4$), and may include hydrogen gas.

As the fluidizing gas supplied additionally to the reaction gas according to the present invention through a gas distributor, nitrogen, hydrogen, argon or helium that does not contain silicon atom can be used. And the constituents of this fluidizing gas may be included in the reaction gas.

It is well known that the etching gas used in the present invention can remove silicon deposit. As explained in the literature (Process Economics Program Report No. 160 "Silicones", pp. 65–70, SRI International, June, 1983), silicon metal forms chlorosilanes like trichlorosilane and silicon tetrachloride through irreversible gasification between hydrogen chloride and silicon at the temperature higher than about 300° C. This gasification reaction proceeds at a very fast speed even at about 300° C. In the present invention the gasification is almost instantaneous, because the reaction temperature of the fluidized bed reactor for silicon deposition is about 1,000° C., in case trichlorosilane is used as the silane gas. Therefore, the etching gas supplied by the etching gas nozzle (4) contacts with silicon deposit generated at the outlet of the reaction gas nozzle (3) to remove the silicon deposit through very fast gasification. And, considering that the gasification of hydrogen chloride and silicon is irreversible, it is not necessary to supply an excess amount of hydrogen chloride to reduce the generation of silicon deposit at the outlet.

The composition of the etching gas and supplying method thereof can be applied in various ways according to the present invention.

Firstly, hydrogen chloride, main constituent of the etching gas, may be supplied without being mixed with an inert gas. However, because the purpose of the operation of the fluidized bed reactor is depositing elementary silicon on the surfaces of fluidizing silicon particles through thermal decomposition or hydrogen reduction of the silane gas, the large amount and high concentration of hydrogen chloride need not be supplied into the reactor.

Also, its feeding rate and supplying type are not limited. The purpose of the present invention can be achieved by supplying the etching gas either continuously or intermittently. For example, by a continuous supply of hydrogen, nitrogen, argon or mixture gas thereof through the etching gas nozzle (4), the increase of the pressure difference can be measured between the reaction gas inlet pressure ($P_r$) of the reaction gas nozzle and the pressure of the reactor inside ($P_v$), $\Delta P = P_r - P_v$, or between the etching gas inlet pressure ($P_e$) of the etching gas nozzle and the pressure of the reactor inside ($P_r$), $\Delta P = P_e - P_v$. Then the measured value of $\Delta P$ represents indirectly the amount of the silicon deposit generated on the outlet surfaces of the reaction gas nozzle. If $\Delta P$ exceeds a predetermined reference value, hydrogen chloride is mixed with inert gas to remove the deposit by the etching gas; and then if $\Delta P$ reduces, the concentration of hydrogen chloride in the etching gas can be reduced or controlled to be zero. According to the procedure, the consumption of hydrogen chloride can be regulated economically.

On the other hand, it is not critical to carefully control the supply of hydrogen chloride. Even if supplied more than required, hydrogen chloride can indirectly accelerates the deposition reaction on the surfaces of fluidizing silicon particles following an increase in their surface temperature due to the highly exothermic gasification reaction between silicon particles and the hydrogen chloride out of the etching gas nozzle. Therefore, it is not necessary to thoroughly control the feed rate or concentration of hydrogen chloride. However, the feed rate of the hydrogen chloride included in the etching gas is recommended to be lower than 40% (on mole basis) of that of the silane gas included in the reaction gas. An excessive feed rate of hydrogen chloride higher than about 40 mole % of the silane gas can conversely decrease the deposition yield on the surfaces of silicon particles.

In the meanwhile, as long as the supply of inert gas is continuously maintained through the etching gas nozzle, the concentration of hydrogen chloride may be changed periodically without undermining the effect of the present invention. It is thus clear that the present invention can be implemented with various designs and operational procedures in accordance with the characteristic of the deposition reactor and the reaction conditions.

The mixture of the reaction gas and fluidizing gas that pass through the fluidized bed equipped with the etching gas nozzle according to the present invention is discharged through the upper part of the reactor as off-gas. Unreacted silane gas, hydrogen gas, hydrogen chloride byproduct and silane byproduct included in the off-gas may be recovered, purified and recycled to the reactor.

Hereunder is given a more detailed description of the present invention using appended drawings.

FIG. 1 is a schematic cross-sectional view of the fluidized reactor used for the preparation of polysilicon according to the present invention.

Generally, silicon particles are filled on a gas distributor (2) in a fluidized bed reactor (1), and the reaction gas and fluidizing gas are supplied through a gas nozzle (3) and the gas distributor (2), respectively, to fluidize the silicon particles. Accordingly, the reaction gas supplying means of the fluidized bed reactor (1) comprises the gas distributor (2) for supplying the fluidizing gas and a reaction gas nozzle (3) combined with the gas distributor.

According to the present invention the accumulation of silicon deposit on the reaction gas supplying means is prevented by supplying the etching gas comprised of hydrogen chloride and an inert gas through an etching gas nozzle (4) equipped in said fluidized bed reactor.

The reaction gas nozzle (3) is installed preferably inside an etching gas nozzle (4) in a coaxial double-pipe form. Also, the elevation of the outlet of the reaction gas nozzle and that of the etching gas nozzle are recommended to be the same or different within the range of about 10–30 mm. Inside the fluidized bed reactor the elevations of the outlets of the reaction gas nozzle and the etching gas nozzle should be higher than that of the gas distributor.

For the reaction gas nozzle (3), etching gas nozzle (4) and gas distributor (2), it is recommended to use high-purity inorganic materials, such as quartz, silicon dioxide ($SiO_2$), silicon nitride ($Si_3N_4$), surface-oxidized silicon (Si) or carbon (C) or silicon carbide (SiC) coated with said materials.

The gas distributor (2) and the reaction gas nozzle (3) used in the fluidized bed reactor may be combined in a single body or assembled together with the product withdrawal means (7).

The gas distributor (2) may be planar or conical, or may have any shape required to distribute the fluidizing gas.

The reaction gas may be supplied through the gas distributor (2). Instead it is common for the reaction gas to be supplied through the reaction gas supplying means consisting of the reaction gas nozzle (3) in combination with the gas distributor (2), because the outlet surfaces the gas distributor are subject to silicon deposition following continuous contact with hot silicon particles.

A desired pattern of fluidized bed is formed by injecting additional fluidized gas through the gas distributor (2) since it is difficult to fluidize the entire silicon particles as required only with the reaction gas supplied through the reaction gas nozzle (3).

FIGS. 2a–2d are cross-sectional views of the etching gas nozzle outlet, which illustrate the methods of supplying etching gas into the fluidized bed reactor through the etching gas nozzle according to the present invention.

Figure 2A:
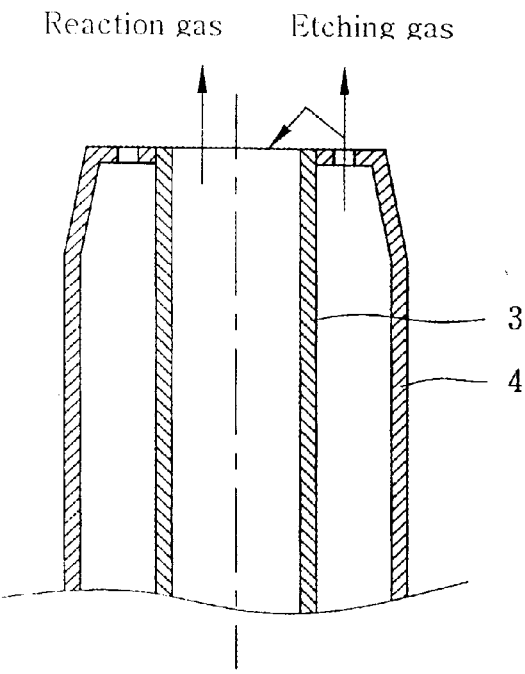
FIGS. 2a–2d are cross-sectional views of the etching gas nozzle outlet, which illustrate the methods of supplying etching gas into the fluidized bed reactor in order to prevent the accumulation of silicon deposit on the outlet surfaces of the reaction gas supplying means according to the present invention.

The method illustrated in FIG. 2a prevents silicon deposition or removes the accumulated silicon deposit formed on the outlet surfaces of the reaction gas nozzle and the etching gas nozzle, whose annular outlet region is joined together and is provided with several small holes for distribution of the etching gas.

Figure 2B:
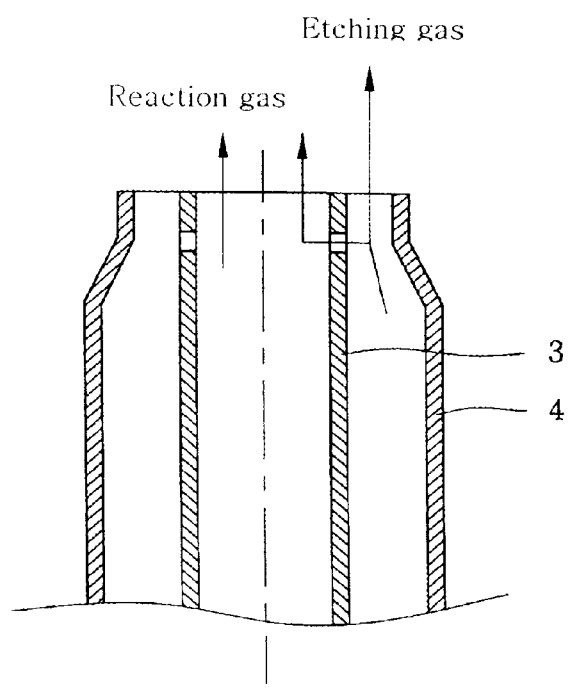

The method illustrated in FIG. 2b prevents silicon deposition or removes the accumulated silicon deposit formed on the inner walls at the outlet surfaces of the reaction gas nozzle (3). The effect is obtained by enabling the etching gas to pass through the small holes provided at the upper section of the reaction gas nozzle (3) as well as through the annular outlet opening of the two nozzles of double-pipe form.

Figure 2C:
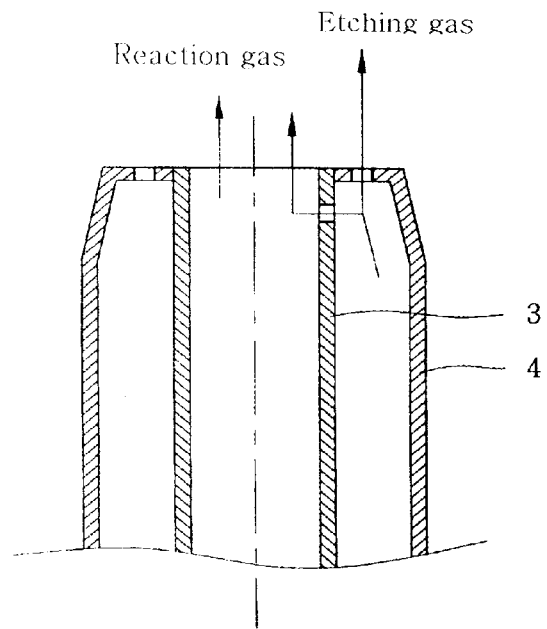

The method illustrated in FIG. 2c, which combines the methods of FIGS. 2a & 2b, prevents silicon deposition or removes the accumulated silicon deposit formed on the inner and outer walls at the outlet surfaces of the reaction gas nozzle (3) and the etching gas nozzle (4). The effect is obtained by enabling the etching gas to pass through the small holes provided at the upper section of the reaction gas nozzle (3) as well as through the small holes provided at the annular region joined together by the two nozzles.

Figure 2D:
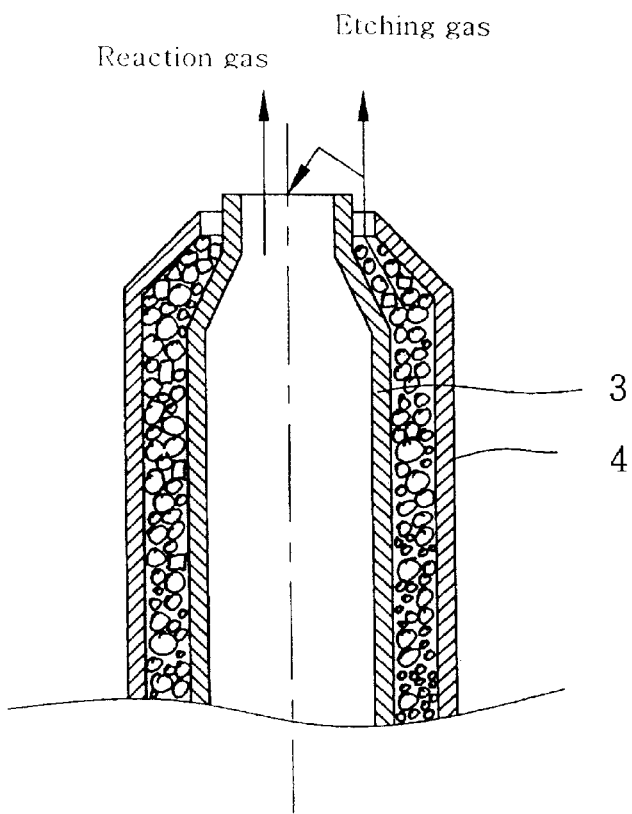

There is a possibility that silicon particles of the fluidized bed unnecessarily move into the holes or the annular opening provided at the outlet section of the double-pipe nozzles. The particles can be accumulated or packed, at their worst, in the annular space between the etching gas nozzle and the reaction gas nozzle. This can hinder the required flow of etching gas. Therefore, as illustrated in FIG. 2d, the annular space may be filled with a stationary filler whose material is preferably similar to that of the etching gas nozzle (4), such as quartz, silica, silicon nitride, surface-oxidized silicon, or carbon or silicon carbide coated with said materials.

As stated above, the objects of the present invention can be achieved by various modifications of the outlet section of the etching gas nozzle and the reaction gas nozzle, as illustrated in FIGS. 2a–2d.

Figure 3A:
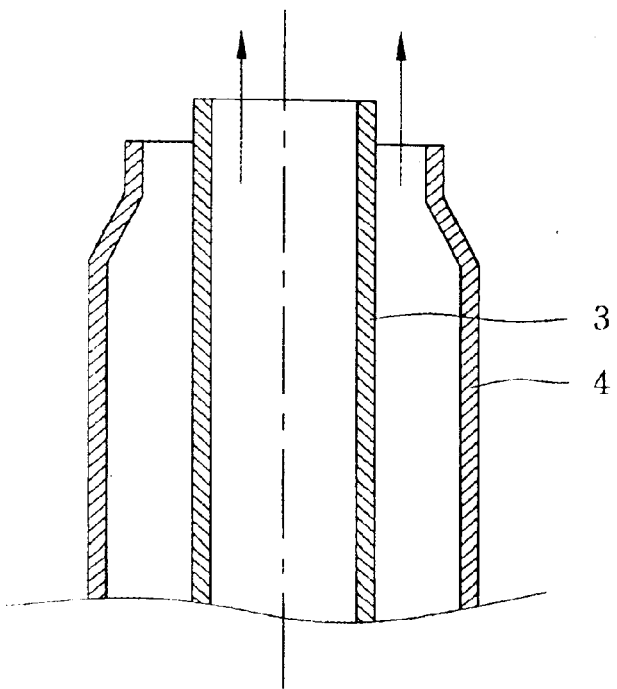
FIGS. 3a–3b are cross-sectional views of the etching gas nozzle outlet, which illustrate the prevention of accumulation of silicon deposit on the outlet surfaces of the reaction gas supplying means equipped with an etching gas nozzle according to the present invention.
Figure 3B:
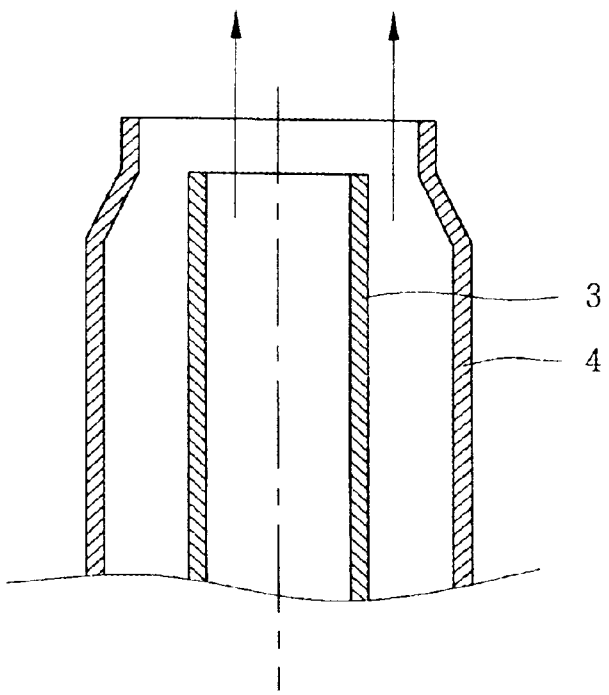

FIGS. 3a–3b are cross-sectional views of the etching gas nozzle outlet, which illustrate the prevention of accumulation of silicon deposit on the outlet surfaces of the reaction gas supplying means equipped with an etching gas nozzle according to the present invention. To be more specific, FIG. 3a is a cross-sectional view of the etching gas nozzle installed in a coaxial double-pipe form together with the reaction gas supplying means, wherein the elevation of the outlet of the reaction gas nozzle is about 10–30 mm higher than that of the etching gas nozzle. Meanwhile, FIG. 3b is a cross-sectional view of the etching gas nozzle installed in a coaxial double-pipe form together with the reaction gas supplying means, wherein the elevation of the outlet of the reaction gas nozzle is about 10–30 mm lower than that of the etching gas nozzle. Both cases illustrate the prevention of accumulation of silicon deposit on the outlet surfaces of the reaction gas supplying means by supplying the etching gas through the etching gas nozzle.

Figure 4A:
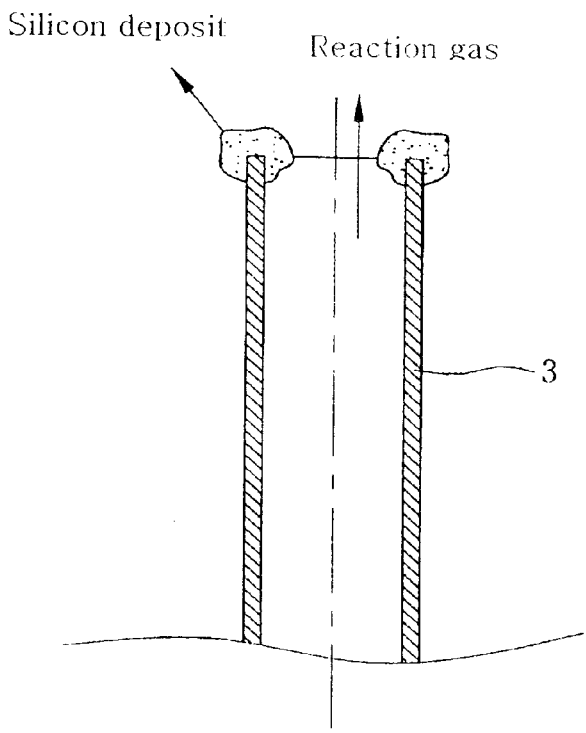
FIG. 4a is a cross-sectional view of the reaction gas nozzle outlet, which shows the accumulation of silicon deposit on the outlet surfaces of the conventional reaction gas supplying means.
Figure 4B:
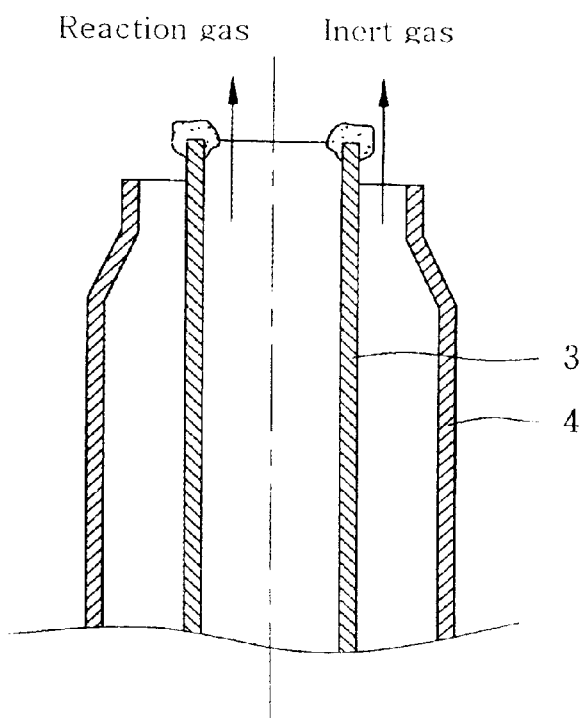
FIG. 4b is a cross-sectional view of the nozzle outlet, which shows the accumulation of silicon deposit on the outlet surfaces of the reaction gas supplying means equipped with an etching gas nozzle when an inert gas not including hydrogen chloride gas is injected into the reactor.

FIG. 4a is a cross-sectional view of the nozzle outlet to illustrate an accumulated silicon deposit on the outlet surfaces of the conventional reaction gas supplying means. Meanwhile, FIG. 4b is a cross-sectional view of the nozzle outlet to illustrate an accumulated silicon deposit on the outlet surfaces of the reaction gas supplying means equipped with an etching gas nozzle according to the present invention, wherein an inert gas not including hydrogen chloride is injected into the reactor.

To prepare polysilicon, application of an effective heating means (5) is essential because the temperature of the fluidized bed inside the reactor, i.e., the temperature of the silicon particles should be maintained high. If silicon deposition proceeds on the surfaces of silicon particles at the reaction temperature, their size increases gradually. Then large silicon particles are withdrawn out of the reactor through a product withdrawal means (7) as polysilicon product granules, whose diameter is about 0.5–5.0 mm. Some of these product granules are pulverized under a high-purity environment to be seed crystals with the particle diameter of about 0.3–0.5 mm. The seed crystals are supplied periodically or continuously into the reactor through a seed crystal supplying means (6). Continuous preparation of polysilicon granules is possible by repeating the supply of seed crystals and withdrawal of the product granules.

As explained above in detail, a method and an apparatus according to the present invention enable the fluidized bed reactor to be operated continuously for the bulk production of polysilicon granules by effectively preventing the accumulation of silicon deposit on the outlet surfaces of the reaction gas supplying means which are exposed to the fluidized bed and are in contact with fluidizing silicon particles.

What is claimed is:

1. In the method for preparing polysilicon by decomposing a silicon containing gas in contact with silicon particles in a fluidized bed reactor;

the improvement, whereby at least reducing the accumulation of silicon deposit on the outlet surfaces of a reaction gas nozzle, comprising:

(a) introducing a fluidizing gas, that does not contain a substantial amount of a silicon containing material, through a gas distributor and into a reaction zone;

(b) forming a fluidized bed of silicon particles above said gas distributor;

(c) introducing a decomposable silicon containing reaction gas, through a reaction gas nozzle, into said fluidized bed;

(d) introducing an etching gas, comprising hydrogen chloride, through an etching gas nozzle that substantially coaxially surrounds said reaction gas nozzle, wherein the elevations of the outlets of both said reaction gas nozzle and said etching gas nozzle are higher than said gas distributor;

(e) providing communication through a common wall of at least a downstream portion of said reaction gas nozzle and at least a downstream portion of said coaxial etching gas nozzle, and (f) distributing said etching gas from said etching gas nozzle through said communication and into reactive contact with inwardly directed outer surfaces of said reaction gas nozzle, whereby removing silicon deposits from said outer reaction gas nozzle surfaces.

2. The improved method for preparing polysilicon according to claim 1, wherein said etching gas comprises a mixture of hydrogen chloride and a gas that is substantially inert under the conditions of said method.

3. The improved method for preparing polysilicon according to claim 2, wherein said inert gas is at least one member selected from the group consisting of hydrogen, nitrogen, argon and helium.

4. The improved method for preparing polysilicon according to claim 1, wherein said fluidizing gas is at least one selected from the group consisting of hydrogen, nitrogen, argon and helium.

5. The improved method for preparing polysilicon according to claim 4, wherein said reaction gas additionally comprises at least one selected from the group consisting of hydrogen, nitrogen, argon and helium.

6. The improved method for preparing polysilicon according to claim 1, wherein said reaction gas comprises at least one member selected from the group consisting of silicon tetrachloride ($SiCl_4$) trichlorosilane ($SiHCl_3$), dichlorosilane ($SiH_2Cl_2$) and monosilane ($SiH_4$).

7. The improved method claimed in claim 1 wherein said reaction gas further comprises hydrogen.

8. The improved method for preparing polysilicon according to claim 1, wherein the distances said reaction gas nozzle and said etching gas nozzle protrude into said fluidized bed from said distributor are the same.

9. The improved method for preparing polysilicon according to claim 1, wherein the distances said reaction gas nozzle and said etching gas nozzle protrude into said fluidized bed from said distributor are different.

10. The improved method for preparing polysilicon according to claim 1, wherein the distances said reaction gas nozzle and said etching gas nozzle protrude into said fluidized bed from said distributor are about 10–30 mm.

11. The improved method for preparing polysilicon according to claim 1, wherein said etching gas nozzle contains stationary filler that enables etching gas to pass therethrough.

12. The improved method for preparing polysilicon according to claim 11, wherein said stationary filler comprises a plurality of particles having open gas space therebetween.

13. The method for preparing polysilicon according to claim 11, wherein the material of said stationary filler is at least one member selected from the group consisting of quartz; silica; silicon nitride; surface-oxidized silicon; carbon coated with at least one material selected from the group consisting of quartz, silica, silicon nitride, and surface oxidized silicon; and silicon carbide coated with at least one material selected from the group consisting of quartz, silica, silicon nitride, and surface oxidized silicon.

* * * * *

UNITED STATES PATENT AND TRADEMARK OFFICE
CERTIFICATE OF CORRECTION

PATENT NO. : 6,541,377 B2
DATED : April 1, 2003
INVENTOR(S) : Kim et al.

It is certified that error appears in the above-identified patent and that said Letters Patent is hereby corrected as shown below:

<u>Title page,</u>
Item [75], Inventors, please correct inventors name to read:
-- Hee Young Kim --

Signed and Sealed this

Twenty-seventh Day of January, 2004

JON W. DUDAS
*Acting Director of the United States Patent and Trademark Office*